Patented Oct. 26, 1948

2,452,171

UNITED STATES PATENT OFFICE 2,452,171

METALLIZABLE MONOAZO DYES

Fritz Straub, Kaiseraugst, Willy Widmer, Bottmingen, and Hermann Schneider, Riehen, Switzerland, assignors to Ciba Limited, a Swiss firm No Drawing. Application April 28, 1944, Serial No. 533,248. In Switzerland December 22, 1942

Section 1, Public Law 690, August 8, 1946
Patent expires December 22, 1962

4 Claims. (Cl. 260—197)

The present invention is concerned with new azo dyestuffs capable of forming complex metal compounds and with the metal compounds thereof. It is an object of the present invention to provide new dyestuffs of the said series possessing valuable shades and/or fastness properties. More particularly it is an object of the present invention to provide chromable wool dyestuffs.

It is well known to couple diazo-components containing lake-forming groups (i. e. groups capable of promoting the formation of complex metal compounds) with 2-hydroxynaphthalene. Some valuable and fast dyestuffs are obtained thereby. It is to be remarked however that the range of shades, obtained by coupling various diazo components with 2-hydroxynaphthalene is rather restricted. Many valuable shades ranging from grey to olive to greenish blue are not obtained or at least not obtained with simple and inexpensive diazo components. It is very surprising that the use of suitably substituted 2-hydroxynaphthalenes as defined hereinafter, makes it possible to produce a series of valuable dyestuffs possessing good fastness and such shades as have not easily been obtained previously, in combination.

According to this invention valuable azo-dyestuffs are made by coupling diazo compounds containing lake-forming groups with dihydroxynaphthalenes whose hydroxyl groups stand in β-position, of which one is etherified, and wherein both ortho-positions with respect to the free hydroxyl group are unoccupied, and treating the dyestuffs thus obtained, if desired, with agents yielding metal.

The dihydroxynaphthalenes used as azo-components in the present process contain the free and etherified hydroxyl group preferably in 2- and 6-position respectively. As etherified hydroxyl groups there may be mentioned especially O-alkyl groups wherein the alkyl radical may be substituted in any desired manner. As examples there may be mentioned: alkoxy groups having a simple alkyl radical of the straight or branched chain type containing up to 6 carbon atoms, such as $OCH_3$— and $OC_2H_5$—, alkoxy groups of which the alkyl radical corresponds to a polyvalent alcohol, e. g. ethylene glycol or glycerine or sorbitol, as well as alkoxy groups of which the alkyl radical contains a solubilizing group, e. g. a carboxyl group.

Such one-sidedly etherified dihydroxynaphthalenes used as azo-components in the present process can be coupled with the most varied diazo components containing lake-forming groups, especially with those of the benzene series. In addition to the so-called lake-forming groups, viz. substituents which impart to the finished dyestuff the property of forming metal complexes which may be an alkoxy, a carboxyl or in the most simple case a hydroxyl group standing in ortho-position to the diazo group, these diazo compounds may further contain the most varied substituents usually occurring in azo-dyestuffs, such as halogens, alkyl-, nitro- and sulfonic acid groups.

Coupling of the said diazo and azo components is effected in known manner, preferably in an alkaline medium, e. g. in a caustic alkaline medium or also in a medium containing alkali carbonate.

The dyestuffs obtained, due to a suitable selection of the components, are capable of forming metal complexes, and particularly valuable products are obtained when treating these dyestuffs with agents yielding metal. This treatment can be carried out in known manner in substance, in the dye-bath or on the fiber. Thus, the metallization can take place in substance, for example with agents yielding chromium, in an acid, neutral or alkaline medium, in the presence or absence of suitable additions such as acids, neutral salts or bases, if desired by using agents which bind acid, indifferent solvents or further additions promoting the formation of complexes, in an open vessel or under pressure.

The metallization in the dye-bath or on the fiber can also be effected in known manner, for example by adding neutral chromates and ammonium salts to the dye-bath, or according to the known after-chroming process.

The dyestuffs obtained according to the present process can be used as pigment dyes, particularly however for dyeing and printing the most various fibers, for example of vegetable, mainly however of animal origin. Examples of such fibers are cotton and rayon, especially, however, wool, silk and leather. According to the present process there are obtained inter alia dyestuffs which dye wool according to the usual chroming processes very fast olive, olive-green and grey shades.

The following examples illustrate the invention, but are not to be regarded as limiting it in any way, the parts being by weight:

Example 1

23.4 parts of 4-nitro-2-amino-1-phenol-6-sulfonic acid are diazotized in known manner and coupled in an alkaline solution with 18 parts of 2-hydroxy-6-methoxynaphthalene. The dyestuff obtained is filtered off and dried. It represents a violet black powder which dissolves in water to a violet blue solution, in dilute caustic soda solution to a brownish bordeaux red solution and in concentrated sulfuric acid to a violet red solution. The dyestuff of the formula

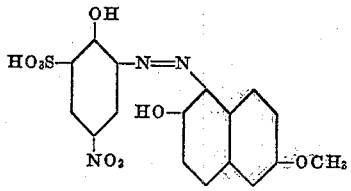

dyes wool from an acid bath uniform violet brown shades which can be converted by after-chroming into an olive-green shade which is excellently fast to milling, potting and light. The dyestuff is excellently suitable for dyeing wool according to the one-bath chroming process, fast olive green dyeings being also obtained thereby.

If the isomeric 6-nitro-2-amino-1-phenol-4-sulfonic acid is used instead of 4-nitro-2-amino-1-phenol-6-sulfonic acid, there is obtained a dyestuff which has similar properties and which dyes wool bluish olive shades according to the after-chroming process.

*Example 2*

19.9 parts of 4:6-dinitro-2-amino-1-phenol are diazotized in known manner and coupled in an alkaline solution with 18 parts of 2-hydroxy-6-methoxynaphthalene. When coupling is complete, the precipitated dyestuff is filtered off and dried. The dyestuff, when dry, is a black brown powder which dissolves in hot water and in hot dilute sodium carbonate solution to a dirty violet red solution and in concentrated sulfuric acid to a violet solution. The dyestuff of the formula

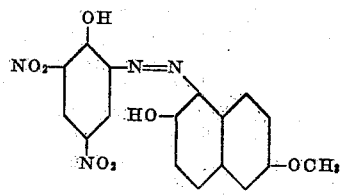

dyes wool from an acid bath violet brown shades which can be converted by after-chroming into an olive shade which is excellently fast to milling, potting and light. The dyestuff is also excellently suitable for dyeing wool according to the one-bath chroming process.

If glycerine-mono-(6-hydroxy - 2 - naphthyl)-ether is used as azo-component instead of 2-hydroxy-6-methoxynaphthalene, there is obtained a similar dyestuff which dyes wool very fast olive shades according to the after-chroming and the one-bath chroming process.

The mono-glycerine ether of the 2:6-dihydroxynaphthalene can be obtained as follows:

160 parts of 2:6-dihydroxynaphthalene are dissolved at 80–85° C. in an inert atmosphere of gas in 1500 parts of water, containing 56 parts of potassium hydroxide of 100 per cent. strength. A solution of 120 parts of glycerine-chlorohydrin in 500 parts of water is introduced at 75–80° C. in the course of 1 hour, while stirring, and the whole is heated for further 4–5 hours at 80–85° C. until a neutral reaction occurs. After cooling to room temperature, the light-grey suspension thus formed is suction-filtered and the paste is stirred in a mixture of 600 parts of water and 150 parts by volume of a caustic soda solution of 30 per cent. strength. The whole is then filtered to remove the undissolved diglycerine ether, and the monoglycerine ether is separated in the filtrate by saturating with common salt. By filtering and washing with brine it is isolated and purified and then dried after neutralization with mineral acid.

*Example 3*

15.4 parts of 5-nitro-2-amino-1-phenol are diazotized in known manner and coupled in an alkaline solution with 24 parts of glycerine-mono-(6-hydroxy-2-naphthyl)-ether. When coupling is complete, the precipitated dyestuff is filtered off and dried.

When dry, it is a violet black powder of the formula

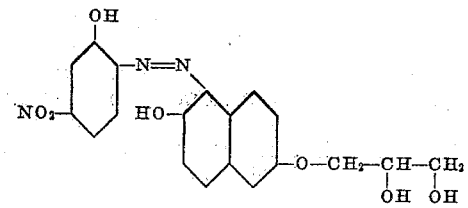

which dissolves in water and dilute sodium carbonate solution to a red blue solution, and in concentrated sulfuric acid to a blue violet solution. The dyestuff dyes wool from an acid bath uniform violet red shades which can be converted by after-chroming into a blue-green shade which is fast to milling, potting and light. The dyestuff is also suitable for dyeing wool according to the one-bath chroming process, fast blue-green dyeings being also obtained thereby.

*Example 4*

18.9 parts of 6-nitro-4-chloro - 2 - amino-1-phenol are diazotized in known manner and coupled in an alkaline solution with 24 parts of glycerine-mono(6-hydroxy - 2 - naphthyl)-ether. When coupling is complete, the precipitated dyestuff is filtered off and dried. When dry, it is a violet-black powder of the formula

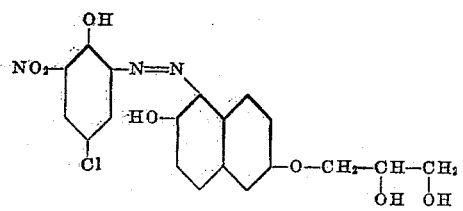

which dissolves in water and dilute sodium carbonate solution to a blue solution and in concentrated sulfuric acid to a violet solution. The dyestuff dyes wool from an acid bath blue shades which can be converted by after-chroming into a greenish grey shade which is excellently fast to milling, potting and light. The dyestuff is excellently suitable for dyeing wool according to the one-bath chroming process.

*Example 5*

23.4 parts of 4-nitro-2-amino-1-phenol-6-sulfonic acid are diazotized in known manner and coupled in an alkaline solution with 24 parts of glycerine-mono-(6-hydroxy-2 - naphthyl)-ether. When coupling is complete, the dyestuff is precipitated by addition of common salt, filtered and dried. When dry, it is a blackish powder which dissolves in water and dilute sodium carbonate solution to a violet-brown solution, and in concentrated sulfuric acid to a violet-red solution. The dyestuff of the formula

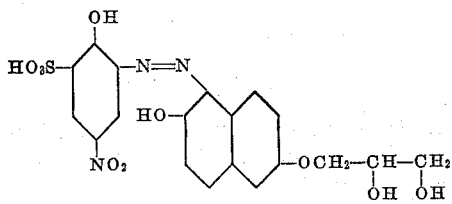

dyes wool from an acid bath violet-brown shades which can be converted by after-chroming into a fast olive-green shade.

If the isomeric 6-nitro-2-amino-1-phenol-4-sulfonic acid is used instead of 4-nitro-2-amino-1-phenol-6-sulfonic acid, there is obtained a dyestuff which dyes wool somewhat more blue-olive shades according to the after-chroming process.

Example 6

22.4 parts of 4-chloro-2-amino-1-phenol-6-sulfonic acid are diazotized in usual manner and coupled in an alkaline solution with 24 parts of glycerine-mono-(6-hydroxy-2-naphthyl) - ether. When coupling is complete, the precipitated dyestuff is filtered off and dried. When dry, it is a violet black powder of the formula

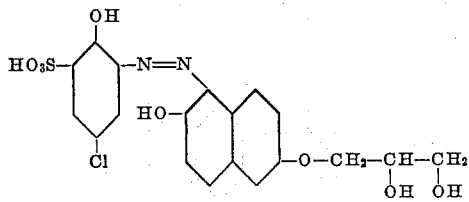

which dissolves in water and dilute sodium carbonate solution to a blue solution, and in concentrated sulfuric acid to a violet red solution. The dyestuff dyes wool from an acid bath bordeaux red shades which can be converted by after-chroming into a grey shade which is very fast to milling and light.

Example 7

15.4 parts of 5-nitro-2-amino-1-phenol are diazotized in known manner and coupled in an alkaline solution with 22 parts of 2-hydroxy-naphthalene-6-hydroxy-acetic acid. When coupling is complete, the precipitated dyestuff is filtered off and dried. When dry it is a violet black powder which dissolves in water and dilute sodium carbonate solution to a blue solution, and in concentrated sulfuric acid to a violet solution. The dyestuff of the formula

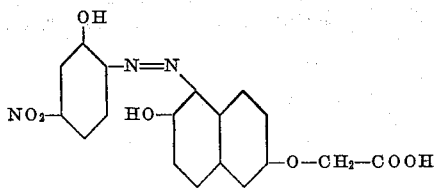

dyes wool from an acid bath uniform, bluish bordeaux red shades which can be converted by after-chroming into a fast blue-green shade.

The 2-hydroxynaphthalene-6-hydroxy-acetic acid can be obtained as follows:

160 parts of 2:6-dihydroxynaphthalene are dissolved in an inert gas atmosphere at 80–85° C. in 1000 parts of water containing 56 parts of potassium hydroxide of 100 per cent. strength. While maintaining this temperature, a neutral solution of about 25 per cent. strength of potassium chloroacetate, containing 110 parts of monochloroacetic acid, are introduced into the above solution in the course of 2 hours. The whole is heated for further 4–5 hours to 90–95° C. until the reaction is nearly neutral. After cooling the reaction mass, the precipitation is completed by salting out, feebly acidifying and filtering. The 2-hydroxynaphthalene-6-hydroxy-acetic acid can be extracted from the filtered paste by repeatedly digesting it at 40–50° C. with a feeble sodium carbonate solution. The filtered sodium carbonate extracts produce a crème colored precipitation of the 2-hydroxy-naphthalene - 6 - hydroxy-acetic acid on acidifying with hydrochloric acid which, in contradistinction to the starting material, is also clearly soluble in a cold, dilute sodium carbonate solution. The product is then filtered and dried.

Example 8

18.9 parts of 6-nitro-4-chloro-2-amino-1-phenol are diazotized in known manner and coupled in an alkaline solution with 22 parts of 2-hydroxy-naphthalene-6-hydroxy-acetic acid. When coupling is complete, the precipitated dyestuff is filtered off and dried. When dry, it is a violet black powder which dissolves in water and dilute sodium carbonate solution to a reddish blue solution, in concentrated sulfuric acid to a violet red solution. The dyestuff of the formula

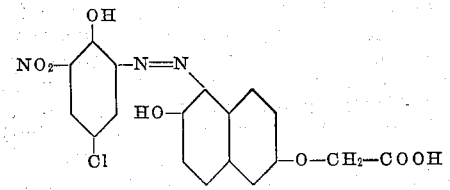

dyes wool from an acid bath blue shades which can be converted by after-chroming into a very fast greenish grey shade.

Example 9

22.4 parts of 4-chloro-2-amino-1-phenol-6-sulfonic acid are diazotized in known manner and coupled in an alkaline solution with 18 parts of 2-hydroxy-6-methoxynaphthalene. When coupling is complete, the precipitated dyestuff is filtered off and dried. When dry, it is a violet black powder which dissolves in water to a reddish blue solution, in dilute caustic soda solution to a violet solution and in concentrated sulfuric acid to a violet red solution. The dyestuff of the formula

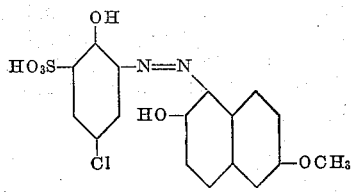

dyes wool from an acid bath bordeaux red shades which can be converted by after-chroming into blue-grey shades which are very fast to light and milling. The dyestuff is also suitable for dyeing according to the one-bath chroming process.

If 2-amino-4-methyl-1-phenol-6-sulfonic acid of -5-sulfonic acid or a mixture of both is used instead of the above mentioned diazo components, a dyestuff having similar properties is obtained which dyes wool according to the after-chroming process somewhat more reddish blue-grey shades.

Example 10

43 parts of the dyestuff from diazotized 4-chloro-2-amino-1-phenol-6-sulfonic acid and 2-hydroxy-6-methoxynaphthalene are heated to boiling for several hours in a reflux apparatus with 1250 parts of water and 200 parts of a chromium fluoride solution containing 4.2 per cent. of $Cr_2O_3$. The chromium compound which has precipitated after heating is filtered off and dried. When dry, it is a violet brown powder which dissolves in dilute hot sodium carbonate solution to a grey violet solution and in concentrated sulfuric acid to a grey solution, and dyes wool from a sulfuric acid bath especially uniform, fast grey shades.

*Example 11*

46.4 parts of the dyestuff from diazotized 4-nitro-2-amino-1-phenol-6-sulfonic acid and 2-hydroxy-6-methoxy-naphthalene (cf. Example 1) are heated to boiling for several hours in a reflux apparatus with 1200 parts of water and 200 parts of a chromium fluoride solution containing 4.2 per cent. of $Cr_2O_3$. The chromium compound of the dyestuff which has precipitated after heating is filtered off and dried after addition of sodium carbonate. When dry, it is a violet brown powder which dissolves in hot water to a grey-green solution and in concentrated sulfuric acid to a grey-violet solution. The chromium compound dyes wool from a sulfuric acid bath fast, especially uniform, grey-green shades.

*Example 12*

100 parts of thoroughly wetted wool are introduced into a dye-bath containing in 4000 parts of water, 2 parts of the dyestuff obtained according to Example 1, first paragraph, 4 parts of acetic acid of 40 per cent. strength and 10 parts of Glauber salt. The temperature of the bath is raised to boiling in the course of 30 minutes and dyeing is continued for 45 minutes at the boil. 1 part of sulfuric acid of 66° Bé. is added to the bath and dyeing is continued for 15 minutes at the boil. The dye-bath is cooled to about 70° C., 1 part of potassium bichromate is added, the temperature is raised to the boil and chroming is effected for about 40 minutes at the boil. The wool is dyed fast olive shades.

*Example 13*

100 parts of wool are introduced at 50° C. into a dye-bath containing in 3000 parts of water 2 parts of the chromium compound obtained according to Example 12 and 4 parts of concentrated sulfuric acid. The temperature of the bath is raised to the boil in the course of about ½ hour, further 4 parts of concentrated sulfuric acid are added and dyeing is continued for 1½ hours at the boil. The wool is dyed fast grey-green shades.

Having thus disclosed the invention, what is claimed is:

1. Azo dyestuffs of the general formula

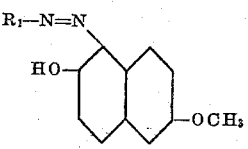

wherein $R_1$ stands for the radical of an ortho hydroxy diazo component of the benzene series.

2. The dyestuff of the formula

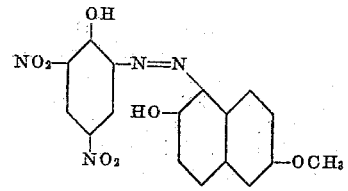

3. The dyestuff of the formula

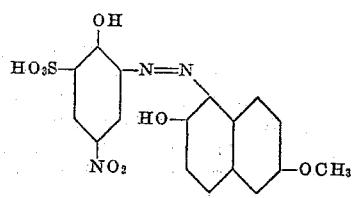

4. The dyestuff of the formula

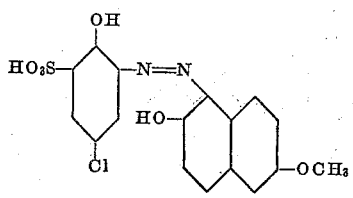

FRITZ STRAUB.
WILLY WIDMER.
HERMANN SCHNEIDER.

REFERENCES CITED

The following references are of record in the file of this patent:

UNITED STATES PATENTS

| Number | Name | Date |
|---|---|---|
| 727,962 | Kahn | May 12, 1903 |
| 833,605 | Julius | Oct. 16, 1906 |
| 2,090,432 | Straub et al. | Aug. 17, 1937 |

FOREIGN PATENTS

| Number | Country | Date |
|---|---|---|
| 14,927 | Great Britain | 1892 |
| 164,317 | Germany | Oct. 19, 1905 |
| 82,904 | Switzerland | Nov. 1, 1919 |
| 627,344 | Germany | Mar. 13, 1936 |